(12) United States Patent
Kondo (10) Patent No.: US 7,538,665 B2
(45) Date of Patent: May 26, 2009

(54) REMOTE-CONTROL SYSTEM, REMOTE CONTROLLER, AND DISPLAY-CONTROL METHOD

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 11/471,706

(22) Filed: Jun. 21, 2006

(65) Prior Publication Data

US 2006/0290823 A1 Dec. 28, 2006

(30) Foreign Application Priority Data

Jun. 27, 2005 (JP) ............................. 2005-186706

(51) Int. Cl.
*G08B 25/00* (2006.01)
(52) U.S. Cl. ..................... 340/525; 348/552; 348/734
(58) Field of Classification Search ................ 340/525, 340/825.69; 348/460, 552, 734, E5.093, 348/E5.103, E5.108, E7.077; 725/110, 112
See application file for complete search history.

(56) References Cited

U.S. PATENT DOCUMENTS

| | | | | |
|---|---|---|---|---|
| 6,021,185 A | * | 2/2000 | Staron | ........................ 348/734 |
| 6,097,441 A | * | 8/2000 | Allport | ........................ 348/552 |
| 7,360,232 B2 | * | 4/2008 | Mitchell | ...................... 725/112 |
| 2002/0057209 A1 | * | 5/2002 | Sampsell | ............... 340/825.69 |
| 2004/0008287 A1 | * | 1/2004 | Johnston et al. | ............. 348/734 |
| 2004/0113892 A1 | * | 6/2004 | Mears et al. | ................. 345/172 |

* cited by examiner

*Primary Examiner*—John A Tweel, Jr.
(74) *Attorney, Agent, or Firm*—Oblon, Spivak, McClelland, Maier & Neustadt, P.C.

(57) ABSTRACT

A remote-control system includes a video-reception device receiving a transmitted video signal and displaying the video image corresponding to the video signal, and a remote controller controlling the video-reception device. The remote controller includes a receive unit which receives the transmitted video signal, a display unit which displays a video image on the basis of the video signal, a reception unit which receives user-operation information, a transmission unit which transmits an operation signal for the video-reception device, and a first control unit that controls the transmission unit according to the user-operation information so that the transmission unit transmits the operation signal. The video-reception device includes a detection unit which detects the transmitted operation signal and a second control unit which controls at least one unit of the video-reception device according to the detected operation signal.

13 Claims, 5 Drawing Sheets

REMOTE-CONTROL SYSTEM, REMOTE CONTROLLER, AND DISPLAY-CONTROL METHOD

CROSS REFERENCES TO RELATED APPLICATIONS

The present invention contains subject matter related to Japanese Patent Application JP 2005-186706 filed in the Japanese Patent Office on Jun. 27, 2005, the entire contents of which are incorporated herein by reference.

BACKGROUND OF THE INVENTION

1. Field of the Invention

The present invention relates to a remote-control system, a remote controller, and a display-control method, and particularly relates to a remote-control system, a remote controller, and a display-control method, where the remote controller is configured to control a television (TV) receiver and receive a TV broadcast signal received by the TV receiver.

2. Description of the Related Art

Usually, TV receivers are provided with remote controllers. As a method for increasing the convenience of the remote controller, there have been proposed inventions allowing the TV receiver to generate a video image displayed by the remote controller and transmit the generated video image to the remote controller. The above-described inventions also allow the remote controller to receive and display the video image transmitted from the TV receiver. The above-described technologies are disclosed, for example, in Japanese Unexamined Patent Application Publication No. 11-69463.

SUMMARY OF THE INVENTION

Making the remote controller display a video image relating to a TV program is effective in increasing the convenience of the remote controller. However, if the TV receiver is configured to generate the video image displayed by the remote controller and transmit the generated video image to the remote controller, as is the case with the invention disclosed in Japanese Unexamined Patent Application Publication No. 11-69463, the size and/or cost of circuits provided in the TV receiver increases.

In consideration of mobile-body reception (to receive a broadcast signal by an on-vehicle TV receiver, a mobile phone with a built-in TV tuner, and so forth), disturbances on a screen image displayed by the digital terrestrial broadcast started from the year 2003 in Japan are significantly less than those on a screen image displayed by a known analog-terrestrial broadcast. The digital terrestrial broadcast allows for transmitting information corresponding to three channels with standard image quality by using the frequency band corresponding to a single channel. In the near future, therefore, it may become possible for the digital terrestrial broadcast to transmit a signal (a signal obtained by encoding the same contents as an ordinary TV program according to an encoding method referred to as H.264/MPEG-4 AVC) generated for a mobile body including the on-vehicle TV receiver, the mobile phone with the built-in TV tuner, and so forth. Hereinafter, a broadcast signal generated for a mobile body in the case where the digital terrestrial broadcast is performed is referred to as a signal-for-mobile body.

As described above, the signal-for-mobile body of the digital-terrestrial broadcast has been intended to be used only for the on-vehicle TV receiver, the mobile phone with the built-in TV tuner, and so forth. Therefore, new methods for using the signal-for-moving body are now currently searched for.

Accordingly, the present invention has been achieved to propose a method for using the signal-for-mobile body and increase the convenience of a system including a device to be controlled and a remote controller.

A remote-control system according to an embodiment of the present invention includes a video-reception device receiving a transmitted video signal and displaying the video image corresponding to the video signal, and a remote controller controlling the video-reception device. The remote controller includes a receive unit configured to receive the transmitted video signal, a display unit configured to display a video image generated on the basis of the video signal received by the receive unit, a reception unit configured to receive information about an operation performed by a user, a transmission unit configured to transmit an operation signal generated for the video-reception device, and a first control unit configured to control the transmission unit according to the user-operation information received by the reception unit so that the transmission unit transmits the operation signal. The video-reception device includes a detection unit configured to detect the transmitted operation signal, and a second control unit configured to control at least one unit of the video-reception device according to the detected operation signal.

A display-control method according to another embodiment of the present invention is used for a remote-control system including a video-reception device receiving a transmitted video signal and displaying the video image corresponding to the video signal, and a remote controller with a display for controlling the video-reception device. The display-control method includes the steps of receiving the transmitted video signal in the remote controller with the display, displaying a video image generated on the basis of the received video signal in the remote controller with the display, receiving information about an operation performed by a user in the remote controller with the display, transmitting an operation signal for the video-reception device in the remote controller with the display, detecting the transmitted operation signal in the video-reception device, and controlling each unit of the video-reception unit according to the detected operation signal in the video-reception device.

According to the above-described embodiment, in the remote controller with the display, the transmitted video signal is received, the video image generated on the basis of the received video signal is displayed, the user-operation information is received, and the operation signal for the video-reception device is transmitted according to the received user-operation information. Further, in the video-reception device, the transmitted operation signal is detected and at least one unit of the video-reception device is controlled according to the detected operation signal.

A remote controller according to another embodiment of the present invention is configured to control a video-reception device receiving a transmitted video signal and displaying the video image corresponding to the video signal. The remote controller includes a receive unit configured to receive the transmitted video signal, a display unit configured to display a video image generated on the basis of the received video signal, a reception unit configured to receive information about an operation performed by a user, and a control unit configured to transmit the operation signal according to the received user-operation information.

The control unit may control the transmission unit according to the user-operation information received by the reception unit so that the transmission unit transmits the operation signal for controlling video display performed by the video-reception device and control the display unit.

The control unit may be configured to control the transmission unit according to the user-operation information received by the reception unit so that the transmission unit transmits the operation signal for controlling video display performed by the video-reception device and control the display unit in relation to the video display performed by the video-reception device.

Preferably, the transmitted video signal includes a main-video signal and an additional-information signal. When the user-operation information received by the reception unit instructs the video-reception device to display only a video image generated on the basis of the main-video signal, the control unit may control the display unit so that the display unit displays a video image generated on the basis of the additional-information signal.

Preferably, the transmitted video signal may include a main-video signal and an additional-information signal. When the user-operation information received by the reception unit instructs the video-reception device to display only a video image generated on the basis of the additional-video signal, the control unit may control the display unit so that the display unit displays a video image generated on the basis of the main-video signal.

Preferably, the remote controller further includes a drawing unit configured to draw a frame indicating a zoom-object position on the display unit. The drawing unit may draw the frame according to the user-operation information received by the reception unit and the control unit may control the transmission unit so that the transmission unit transmits the operation signal indicating the position and size of the drawn frame.

A display-control method according to another embodiment of the present invention is used for a remote controller with a display, where the remote controller is configured to control a video-reception device receiving a transmitted video signal and displaying the video image corresponding to the video signal. The display-control method includes the steps of receiving the transmitted video signal, displaying a video image generated on the basis of the received video signal, receiving information about an operation performed by a user, and transmitting an operation signal for the video-reception device according to the received user-operation information.

According to another embodiment of the present invention, the transmitted video signal is received, the video image generated on the basis of the received video signal is displayed, the user-operation information is received, and the operation signal for the video-reception device is transmitted according to the received user-operation information. Further, in the video-reception device, the transmitted operation signal is detected and at least one unit of the video-reception device is controlled according to the detected operation signal.

Thus, according to an embodiment of the present invention, it becomes possible to make the remote controller display the video image corresponding to the video image generated by the video-reception device and increase the system including the device to be controlled and the remote controller.

Further, according to another embodiment of the present invention, it becomes possible to display the video image corresponding to the video image generated by the video-reception device and increase the convenience of the remote controller operated by the user.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that specific elements disclosed in embodiments supporting the claimed invention are described in this specification. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 1:
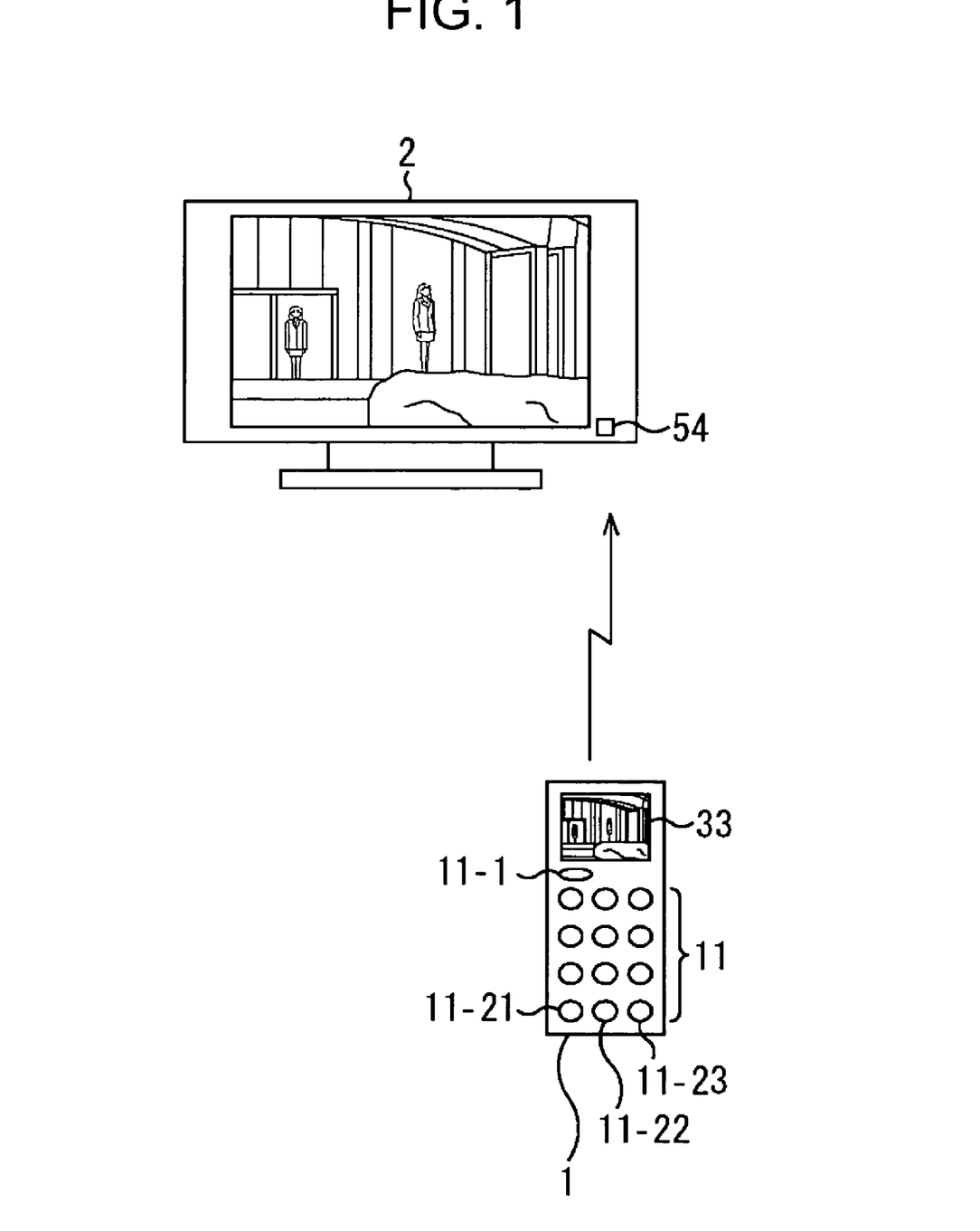
FIG. 1 shows an example configuration of a TV system according to an embodiment of the present invention.
Figure 2:
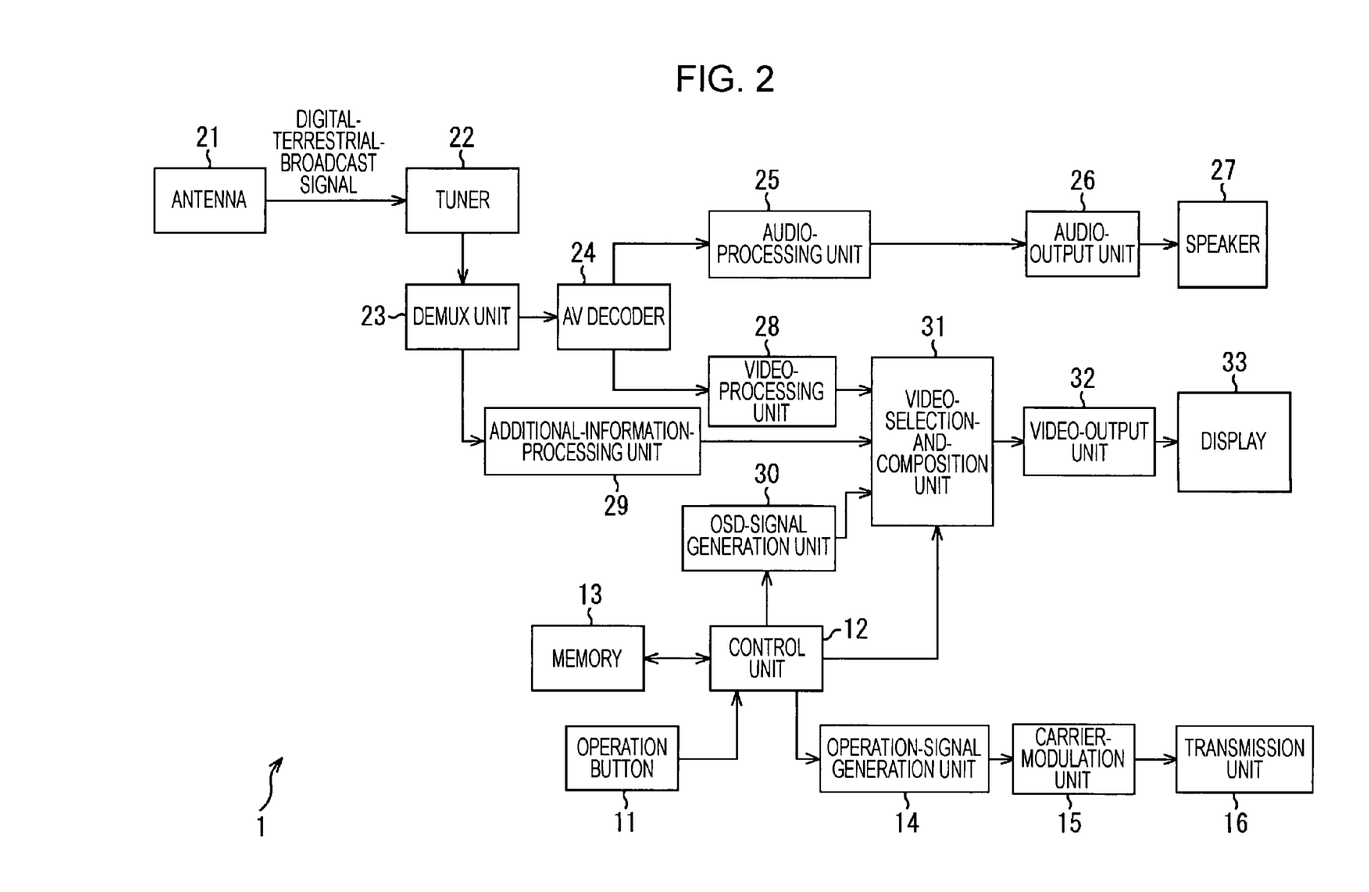
FIG. 2 is a block diagram showing an example configuration of a remote controller shown in FIG. 1.

A remote-control system according to an embodiment of the present invention includes a video-reception device that receives a transmitted video signal and that displays the video image corresponding to the video signal (e.g., a television receiver 2 shown in FIG. 1) and a remote controller that controls the video-reception device (the remote controller 1 shown in FIG. 1, for example). The remote controller includes a receive unit which receives the transmitted video signal (e.g., a tuner 22 shown in FIG. 2), a display unit which displays a video image generated on the basis of the video signal received by the receive unit (e.g., a video selection-and-composition unit 31, a video-output unit 32, and a display 33 that are shown in FIG. 2), a reception unit configured to receive information about an operation performed by a user (e.g., control buttons 11 shown in FIG. 2), a transmission unit which transmits an operation signal to the video-reception device (e.g., an operation-signal generation unit 14, a carrier-modulation unit 15, and a transmission unit 16 that are shown in FIG. 2), and a first control unit (e.g., a control unit 12 shown in FIG. 2) that controls the transmission unit so that the transmission unit transmits the operation signal and that controls each of the above-described units of the remote controller according to the user-operation information received by the reception unit. The video-reception device includes a detection unit (e.g., an operation-signal reception unit 54 shown in FIG. 3) which detects the transmitted operation signal and a second control unit (e.g., a control unit 52 shown in FIG. 3) which controls each unit of the video-reception device according to the detected operation signal.

A display-control method according to another embodiment of the present invention is used for a remote control system including a video-reception device that receives a transmitted video signal and that displays the video image corresponding to the video signal, and a remote controller with a display, the remote controller being configured to control the video-reception device. According to the display-control method, the following steps are performed by the remote controller with the display. Namely, the remote controller with the display receives the transmitted video signal, displays a video image generated on the basis of the received video signal, receives information about an operation performed by a user, transmits a control signal to the video-reception device, and controls each of the units of the remote controller (refer to a flowchart shown in FIG. 4, for example) according to the received user-operation information. Further, the following steps are performed by the video-reception device. Namely, the video-reception device detects the transmitted operation signal and controls each unit of the video-reception device according to the detected operation signal (refer to a flowchart shown in FIG. 5, for example).

A remote controller according to another embodiment of the present invention is configured to receive a transmitted video signal and control a video-reception device which displays the video image corresponding to the video signal. The remote controller includes a receive unit which receives the transmitted video signal (e.g., the tuner 22 shown in FIG. 2), a display unit which displays a video image generated on the basis of the received video signal (e.g., the video selection-and-composition unit 31, the video-output unit 32, and the display 33 that are shown in FIG. 2), a reception unit which receives information about an operation performed by a user (e.g., the operation buttons 11 shown in FIG. 2), and a control unit that transmits the operation signal and that controls each of the units of the remote controller according to the received user-operation information (e.g., the control unit 12 shown in FIG. 2).

The remote controller may further include a drawing unit which draws a frame indicating a zoom-object position on the display unit (e.g., an on-screen-display (OSD) signal generation unit 30 shown in FIG. 2). The drawing unit draws the frame according to the user-operation information received by the reception unit. The control unit controls the transmission unit so that the transmission unit transmits the operation signal indicating the position and size of the drawn frame.

The display-control method according to another embodiment of the present invention is used for a remote controller with a display, the remote controller being configured to control a video-reception device that receives a transmitted video signal and that displays the video image corresponding to the video signal. The display-control method has the following steps. Namely, the transmitted video signal is received, a video image generated on the basis of the received video signal is displayed, information about an operation performed by a user is received, and an operation signal is transmitted to the video-reception device and each of the units of the remote controller is controlled according to the received user-operation information (refer to a flowchart shown in FIG. 4, for example).

Hereinafter, embodiments of the present invention will be described in detail with reference to the attached drawings.

FIG. 1 shows an example configuration of a television (TV) system according to an embodiment of the present invention. The TV system includes a remote controller 1 which transmits an operation signal according to information about an operation performed by a user and a TV receiver 2 which operates according to the operation signal transmitted from the remote controller 1.

The remote controller 1 has the operation buttons 11 and the display 33 on its front part. The remote controller 1 has an ordinary function such as the function of transmitting an operation signal according to information transmitted from the user, where the information is about operations performed by the user. Namely, the operations include, for example, switching back and forth between reception channels, turning up and/or down the sound volume, and making settings such as adjusting the image quality and/or the audio quality. Further, the remote controller 1 receives a signal generated for a moving body, where the signal corresponds to the same contents as those of a program transmitted to the TV receiver 1 which is a control object, and displays the video image corresponding to the signal-for-moving body on the built-in display 33.

The digital-terrestrial broadcast is performed by using an ordinary broadcast signal (a broadcast signal which is not generated for a moving body such as a vehicle but for an ordinary TV receiver used in a house or the like) and the above-described signal-for-moving body at the same time. Further, a program achieved by using the ordinary broadcast signal is the same as that achieved by using the signal-for-moving body, even though the encoding method, image quality, and so forth of the program achieved by using the ordinary broadcast signal may be different from those of the program achieved by using the signal-for-moving body. Each of the ordinary broadcast signal and the signal-for-moving body includes information about a video image which should be displayed and superimposed on a video image of the program, where the information denotes data items including time-signal information, EPG data, caption-text data, telop data such as a news flash, and so forth. Each of the data items can be extracted separately. Hereinafter, information about a video image which should be displayed and superimposed on the above-described video image of the program is referred to as additional information.

The TV receiver 2 receives a signal of the digital terrestrial broadcast, displays the video image thereof, and outputs an audio signal according to an operation signal transmitted from the remote controller 1 to an operation-signal reception unit 54. Further, the TV receiver 2 magnifies (zooms in on) a predetermined area on a screen image and moves (pans and/or tilts) the position of an area for magnification in horizontal directions and/or vertical directions.

The remote controller 1 may receive an ordinary broadcast signal of the digital terrestrial broadcast in place of the signal-for-moving body and display the video image corresponding to the ordinary broadcast signal, where the ordinary broadcast signal is transmitted to the TV receiver 1 which is the control object. However, considering the sensitivity of an antenna 21 provided in the remote controller 1, the screen-frame size of the display 33, the load of a built-in AV decoder 24, and so forth, it is preferable that the remote controller 1 receives the signal-for-moving body and displays the video image corresponding to the signal-for-moving body.

FIG. 2 shows an example configuration of the remote controller 1.

The operation buttons 11 include a plurality of buttons used for making various settings on the TV receiver 2, where the settings denote switching back and/or forth between channels, turning up and/or down the sound volume, and so forth. Each of the operation buttons 11 detects a press-down operation performed by the user and transmits the signal corresponding to the detected operation to the control unit 12. Particularly, the operation buttons 11 include a reception button 11-1 that allows reception of the signal-for-mobile body transmitted to the remote controller 1 and that starts and/or finishes displaying the video image corresponding to the signal-for-mobile body, a display-mode button 11-21 configured to select display mode which will be described later (a button which selects display mode 1), a display-mode button 11-22 (a button which selects display mode 2), and a display-mode button 11-23 (a button which selects display mode 3).

In addition to the above-described buttons, input devices including a stick, a dial, a touch panel, and so forth may be provided.

The control unit 12 controls the entire remote controller 1 according to a control program stored in a memory 13. Control lines extending from the control unit 12 to the units of the remote controller 1 are not shown. Particularly, the control unit 12 makes the operation-signal generation unit 14 generate the operation signal corresponding to the operation button 11 pressed down by the user on the basis of the detection result of the operation button 11. Further, the control unit 12 makes the OSD-signal generation unit 30 generate the OSD signal corresponding to the operation button 11 pressed down by the user, where the OSD signal denotes the video signal corresponding to a number indicating a selected channel, a number indicating the changed sound volume, a level gauge, a frame indicating the magnification position, a cursor, and so forth. Further, where the detection result of the operation button 11 corresponds to a display-mode change operation, the control unit 12 controls a composite video image generated by the video selection-and-composition unit 31.

The operation-signal generation unit 14 transmits the generated operation signal to the carrier-modulation unit 15 which modulates a carrier wave by using the operation signal and transmits the modulated carrier wave to the transmission unit 16. The transmission unit 16 transmits the modulated carrier wave (hereinafter simply referred to as the operation signal) by using an infrared ray, an electromagnetic wave, and so forth.

The tuner 22 receives a signal-for-moving body of the same channel as that transmitted to the TV receiver 2 from a digital-terrestrial-broadcast signal acquired by the built-in antenna 21 and transmits the signal-for-moving body to a DEMUX unit 23. The DEMUX unit 23 separates video data relating to a program video image, audio data relating to audio, and the additional information from the signal-for-moving body transmitted from the tuner 22, transmits the video data and the audio data to the AV decoder 24, and transmits the additional information to the additional-information processing unit 29.

The AV decoder 24 decodes the video data and the audio data that are transmitted from the DEMUX unit 23 so that an audio signal and a video signal are obtained. Then, the AV decoder 24 transmits the audio signal to the audio-signal processing unit 25 and transmits the video signal to the video-signal processing unit 28.

The audio-processing unit 25 performs predetermined processing for the audio signal transmitted from the AV decoder 24, and transmits the audio signal to the audio-output unit 26. The audio-output unit 26 amplifies the audio signal transmitted from the audio-processing unit 25, and transmits the amplified audio signal to a speaker 27 provided in the remote controller 1. The speaker 27 transmits the output audio signal corresponding to an input transmitted from the audio-output unit 26. The audio-processing unit 25, the audio-output unit 26, and the speaker 27 may not be provided.

The video-processing unit 28 performs predetermined image processing for the video signal transmitted from the AV decoder 24 (hereinafter referred to as a main-video signal), and transmits the main-video signal to the video selection-and-composition unit 31. The additional-information processing unit 29 generates the video signal corresponding to additional information that should be superimposed on a video image of the program on the basis of the additional information transmitted from the AV decoder 24, and transmits the generated video signal to the video selection-and-composition unit 31. The OSD-signal generation unit 30 transmits the generated OSD signal to the video-selection unit 31. Hereinafter, each of the video signal and OSD signal corresponding to the additional information that should be superimposed on a video image of a program will be referred to as an additional-video signal.

The video selection-and-composition unit 31 transmits the main-video signal alone, the additional-video signal alone, or a video signal including the main-video signal combined with the additional-video signal (hereinafter referred to as a composite-video signal) to the video-output unit 32. The video-output unit 32 converts the video signal transmitted from the video selection-and-composition unit 31 into a signal in a predetermined format appropriate for the display 33 and transmits the converted signal to the display 33. The display 33 displays the video image corresponding only to the main-video signal transmitted from the video-output unit 32 (hereinafter referred to as a main-video image), the video image corresponding only to the additional-video signal (hereinafter referred to as an additional-video image), or the video image corresponding to the composite-video signal (hereinafter referred to as a composite-video image).

Figure 3:
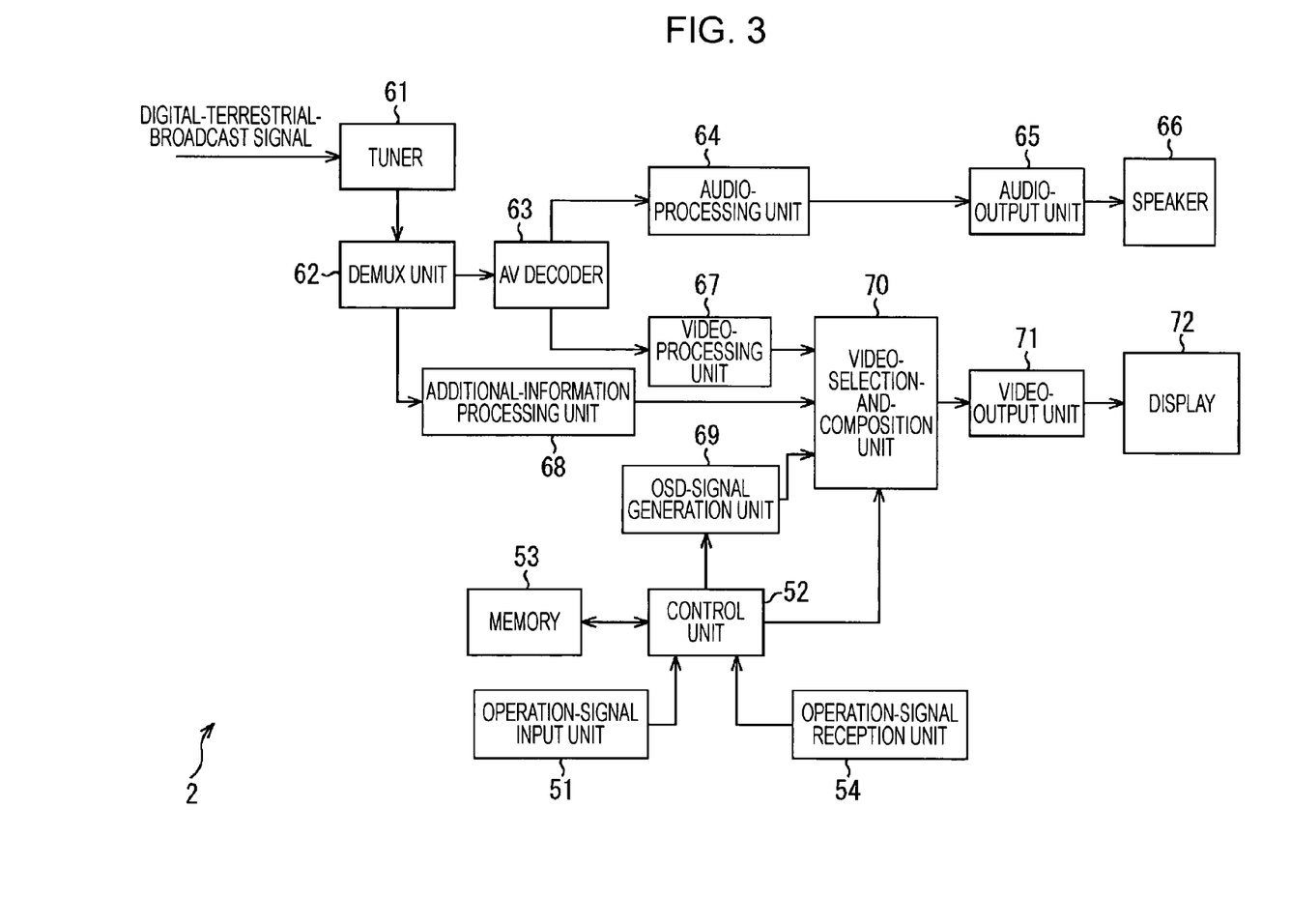
FIG. 3 is a block diagram showing an example configuration of a TV receiver shown in FIG. 1.

FIG. 3 shows an example configuration of the TV receiver 2.

An operation-signal input unit 51 includes a plurality of buttons provided on the outside of a cabinet of the TV receiver 2, for example. The operation-signal input unit 51 detects a press-down operation performed by the user, generates the operation signal corresponding to the detected press-down operation, and transmits the operation signal to the control unit 52.

The control unit 52 controls the entire TV receiver 2 according to a control program stored in a memory 53. Control lines extending from the control unit 52 to the units of the TV receiver 2 are not shown. Particularly, the control unit 52 makes an OSD-signal generation unit 69 generate the OSD signal corresponding to an operation signal on the basis of the operation signal transmitted from the operation-signal input unit 51 and/or an operation-signal reception unit 54. The OSD signal denotes the video signal corresponding to a number indicating a selected channel, a number indicating the changed sound volume, a level gauge, and so forth. Further, where the operation signal functions as an instruction for changing display mode, the control unit 52 controls a composite-video image generated by a video selection-and-composition unit 70. The operation-signal reception unit 54 receives an operation signal transmitted from the remote controller 1 and transmits the operation signal to the control unit 52.

A tuner 61 receives a broadcast signal of a channel selected by the user from a digital-terrestrial-broadcast signal transmitted from an antenna line or the like (not shown) and transmits the broadcast signal to a DEMUX unit 62. The DEMUX unit 62 separates video data relating to a program video image, audio data relating to audio, and additional information from the broadcast signal transmitted from the tuner 61, transmits the video data and the audio data to an AV decoder 63, and transmits the additional information to an additional-information processing unit 68.

The AV decoder 63 decodes the video data and the audio data that are transmitted from the DEMUX unit 62 so that an audio signal and a video signal are obtained. Then, the AV decoder 63 transmits the audio signal to an audio-signal processing unit 64 and transmits the video signal to a video-signal processing unit 67.

The audio-processing unit 64 performs predetermined processing for the audio signal transmitted from the AV decoder 63, and transmits the audio signal to an audio-output unit 65. The audio-output unit 65 amplifies the audio signal transmitted from the audio-processing unit 64, and transmits the amplified audio signal to a speaker 66. The speaker 66 transmits the audio corresponding to an input transmitted from the audio-output unit 65.

A video-processing unit 67 performs predetermined processing including resolution-conversion processing, zooming processing, and so forth for the video signal transmitted from the AV decoder 63 (hereinafter referred to as a main-video signal), and transmits the main-video signal to the video selection-and-composition unit 70. The additional-information processing unit 68 generates the video signal corresponding to additional information that should be superimposed on a video image of the program on the basis of the additional information transmitted from the AV decoder 63, and transmits the generated video signal to the video selection-and-composition unit 70. The OSD-signal generation unit 69 transmits the generated OSD signal to the video selection-and-composition unit 70. Hereinafter, each of the video signal and OSD signal corresponding to the additional information that should be superimposed on the video image of the program will be referred to as an additional-video signal.

The video selection-and-composition unit 70 transmits the main-video signal alone, the additional-video signal alone, or the composite-video signal including the main-video signal combined with the additional-video signal to a video-output unit 71. A video-output unit 71 converts the video signal transmitted from the video selection-and-composition unit 70 into a signal in a predetermined format appropriate for a display 72 and transmits the converted signal to the display 72. The display 72 displays the video image corresponding only to the main-video signal transmitted from the video-output unit 71 (hereinafter referred to as a main-video image), the video image corresponding only to the additional-video signal (hereinafter referred to as an additional-video image), or the video image corresponding to the composite-video signal (hereinafter referred to as a composite-video image).

Hereinafter, three types of display modes 1, 2, and 3 will be described.

The display mode 1 is selected so that the display 33 of the remote controller 1 displays the additional-video image alone and the display 72 of the TV receiver 2 displays the main-video image alone. The display mode 2 is selected so that the display 33 displays the main-video image alone and the display 72 of the TV receiver 2 displays the additional-video image alone. The display mode 3 is selected so that the display 33 displays the additional-video image alone, the main-video image alone, or the composite-video image. In that case, which image should be displayed is determined in advance. Further, when the display mode 3 is selected, the display 72 displays the composite-video image.

Next, processing procedures performed by the remote controller 1 and the TV receiver 2 will be described.

Figure 4:
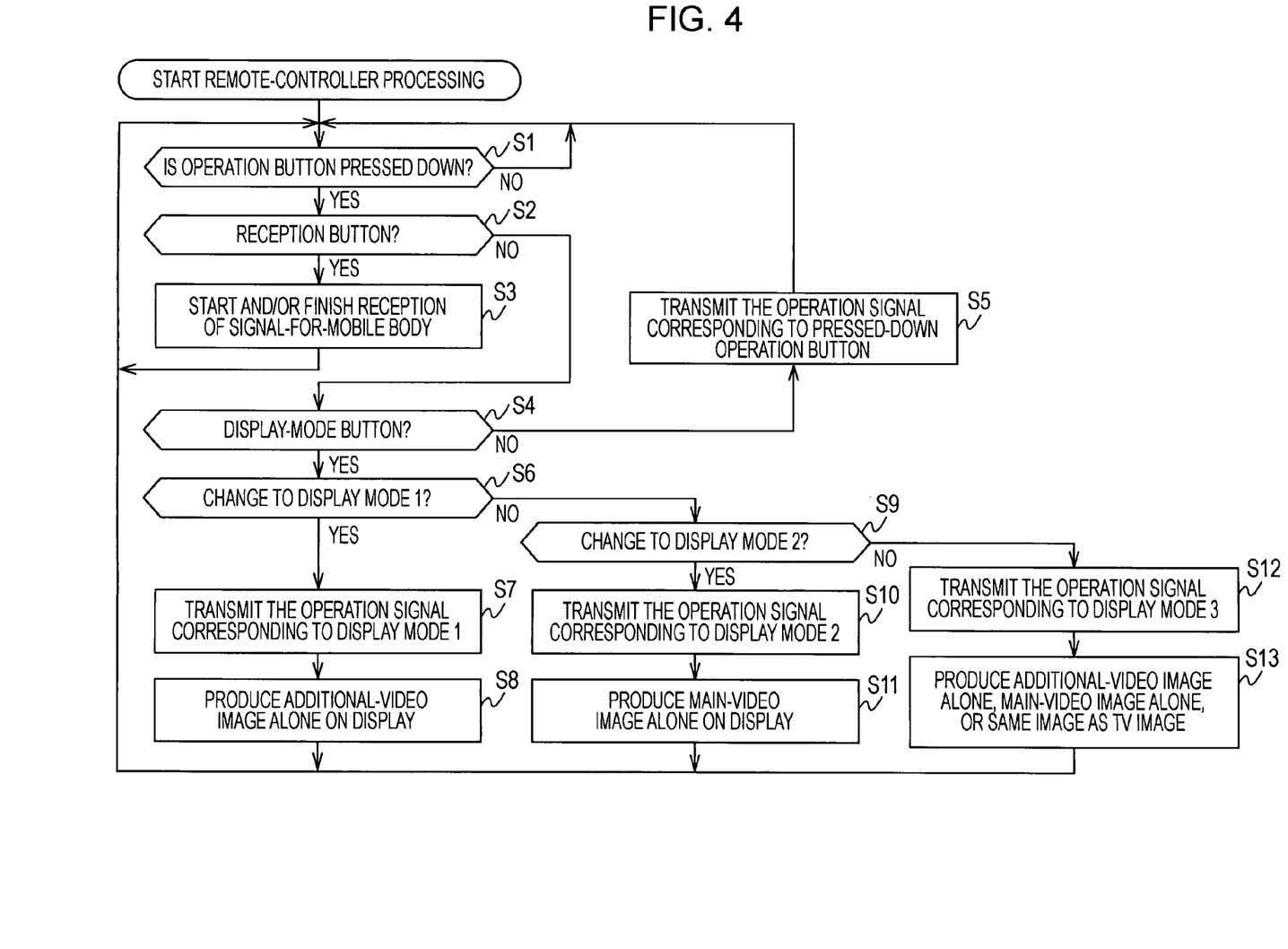
FIG. 4 is a flowchart illustrating processing procedures performed by the remote controller shown in FIG. 1.

FIG. 4 is a flowchart illustrating the processing procedures performed by the remote controller 1. At step S1, the control unit 12 determines whether or not the operation button 11 is pressed down on the basis of whether or not an input signal is transmitted from the operation button 1 and waits until it is determined that the operation button 11 is pressed down. If it is determined that the operation button 11 is pressed down, the processing advances to step S2.

At step S2, the control unit 12 determines whether or not the pressed operation button 11 is the reception button 11-1. If it is determined that the reception button 11-1 is pressed down, the processing advances to step S3. At step S3, it is determined whether or not the remote controller 1 receives the signal-for-moving body and shows the video image corresponding to the signal-for-moving body. If the signal-for-moving body is received and the video image corresponding thereto is displayed, processing including reception, separation, decoding, and so forth is performed for the signal-for-moving body, and the corresponding video image is displayed according to the currently-selected display mode.

More specifically, the tuner 22 receives a signal-for-moving body of the same channel as that of a program received by the TV receiver 2, and the DEMUX unit 23 separates video data relating to a video image of the program, audio data relating to audio, and additional information from the signal-for-moving body received by the tuner 22. Further, the AV decoder 24 decodes the video data and audio data transmitted from the DEMUX unit 23 so that a voice signal and a video signal are obtained. The voice signal is transmitted to the audio-signal processing unit 25 and the video signal is transmitted to the video-signal processing unit 28. The video-processing unit 28 performs predetermined image processing for the main-video signal transmitted from the AV decoder 24 and transmits the main-video signal to the video selection-and-composition unit 31. The additional-information processing unit 29 generates and transmits the additional-video signal corresponding to the additional information separated by the DEMUX unit 23 to the video selection-and-composition unit 31.

The video selection-and-composition unit 31 transmits the main-video signal alone, the additional-video signal alone, or the composite-video signal including the main-video signal combined with the additional-video signal to the video-output unit 32 according to the currently set display mode. The video-output unit 32 changes the format of the video signal, and the display 33 displays a main-video image, an additional-video image, or a composite-video image. Then, the processing returns to step S1 so that the processing from then on is performed again.

On the contrary, at step S3, if it is determined that the remote controller 1 receives the signal-for-mobile body and displays the video image corresponding to the signal-for-mobile body, processing such as reception of the signal-for-moving body is finished. Then, the processing returns to step S1 so that the processing from then on is performed again.

If it is determined that the operation button 11 pressed down by the user is not the reception button 11-1, at step S2, the processing advances to step S4.

At step S4, the control unit 12 determines whether or not the operation button 11 pressed down by the user is one of display-mode buttons 11-21, 11-22, and 11-23. If it is determined that any of the display-mode buttons 11-21, 11-22, and 11-23 is not pressed down, the processing advances to step S5 so that the operation-signal generation unit 14 generates and transmits the operation signal corresponding to the pressed-down operation button 11 to the carrier-modulation unit 15 under the control of the control unit 12. The carrier-modulation unit 15 modulates a carrier wave on the basis of the generated operation signal and transmits the carrier wave to the transmission unit 16. The transmission unit 16 transmits the carrier wave modulated according to the operation signal. The carrier wave, that is, the operation signal is transmitted to the TV receiver 2, and the TV receiver 2 performs the operation corresponding to the operation signal. After that, the processing returns to step S1 so that the processing from then on is performed again.

If it is determined that the pressed-down operation button 11 is one of the display mode buttons 11-21 to 11-23, at step S4, the processing advances to step S6.

At step S6, the control unit 12 determines whether or not the pressed-down operation button 11 is the display-mode button 11-21 provided for selecting the display mode 1. If it is determined that the display-mode button 11-21 is pressed down, the processing advances to step S7.

At step S7, the operation-signal generation unit 14 generates and transmits the operation signal corresponding to the pressed-down display-mode button 11-21 to the carrier-modulation unit 15 under the control of the control unit 12. The carrier-modulation unit 15 modulates a carrier wave on the basis of the generated operation signal and transmits the carrier wave to the transmission unit 16. The transmission unit 16 transmits the carrier wave modulated according to the operation signal. The transmitted carrier wave, that is, the operation signal is transmitted to the TV receiver 2, and the TV receiver 2 performs the operation corresponding to the display mode 1 (the processing corresponding to step S35 shown in FIG. 5).

At step S8, the video selection-and-composition unit 31 transmits the additional-video signal to the following stage under the control of the control unit 12. The video-output unit 32 converts the additional-video signal transmitted from the video selection-and-composition unit 31 to a signal in a format appropriate for the display 33 and transmits the signal to the display 33. The display 33 displays the additional-video image corresponding to the additional-video signal transmitted from the video-output unit 32. After that, the processing returns to step S1 and the processing from then on is performed again.

If it is determined that the pressed-down operation button 11 is not the display-mode button 11-21, at step S6, the processing advances to step S9.

At step S9, the control unit 12 determines whether or not the pressed-down operation button 11 is the display-mode button 11-22 provided for selecting the display mode 2. If it is determined that the display-mode button 11-22 is pressed down, the processing advances to step S10.

At step S10, the operation-signal generation unit 14 generates and transmits the operation signal corresponding to the pressed-down display-mode button 11-22 to the carrier-modulation unit 15 under the control of the control unit 12. The carrier-modulation unit 15 modulates a carrier wave on the basis of the generated operation signal and transmits the carrier wave to the transmission unit 16. The transmission unit 16 transmits the carrier wave modulated according to the operation signal. The transmitted carrier wave, that is, the operation signal is transmitted to the TV receiver 2, and the TV receiver 2 performs the operation corresponding to the display mode 2 (the processing corresponding to step S37 shown in FIG. 5).

At step S11, the video selection-and-composition unit 31 transmits the main-video signal to the following stage under the control of the control unit 12. The video-output unit 32 converts the main-video signal transmitted from the video selection-and-composition unit 31 to a signal in a format appropriate for the display 33 and transmits the signal to the display 33. The display 33 displays the main-video image corresponding to the main-video signal transmitted from the video-output unit 32. After that, the processing returns to step S1 and the processing from then on is performed again.

If it is determined that the pressed-down operation button 11 is not the display-mode button 11-22, at step S9, the pressed-down operation button 11 is determined to be the display-mode button 11-23 provided for selecting the display mode 3. Then, the processing advances to step S12.

At step S12, the operation-signal generation unit 14 generates and transmits the operation signal corresponding to the pressed-down display-mode button 11-23 to the carrier-modulation unit 15 under the control of the control unit 12. The carrier-modulation unit 15 modulates a carrier wave on the basis of the generated operation signal and transmits the carrier wave to the transmission unit 16. The transmission unit 16 transmits the carrier wave modulated according to the operation signal. The transmitted carrier wave, that is, the operation signal is transmitted to the TV receiver 2, and the TV receiver 2 performs the operation corresponding to the display mode 3 (the processing corresponding to step S38 shown in FIG. 5).

At step S13, the video selection-and-composition unit 31 transmits the main-video signal, the additional-video signal, or the composite-video signal including the main-video signal combined with the additional-video signal to the following stage under the control of the control unit 12. Here, which of the above-described signals is transmitted is determined in advance. The video-output unit 32 converts the video signal transmitted from the video selection-and-composition unit 31 to a signal in a format appropriate for the display 33 and transmits the signal to the display 33. The display 33 displays the video image corresponding to the video signal transmitted from the video-output unit 32. Namely, the main-video image, the additional-video image, or the composite-video image is displayed. After that, the processing returns to step S1 and the processing from then on is performed again. The description of the processing procedures performed by the remote controller 1 is hereby finished.

Figure 5:
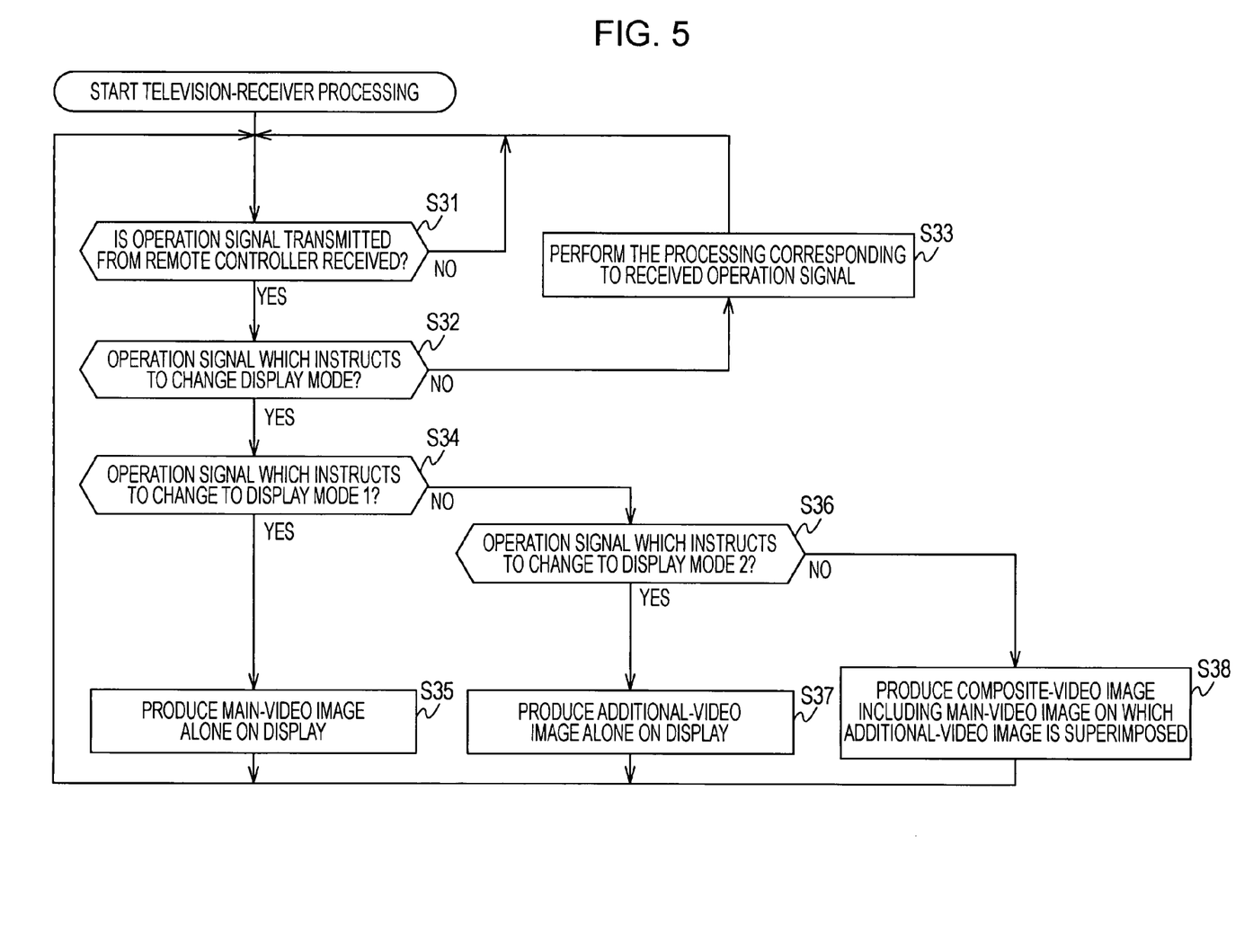
FIG. 5 is a flowchart illustrating processing procedures performed by the TV receiver shown in FIG. 1.

FIG. 5 is a flowchart illustrating processing procedures performed by the TV receiver 2. The processing procedures are started on the premises that the TV receiver 2 receives the ordinary broadcast signal of the digital terrestrial broadcast and the video image corresponding to the broadcast signal is displayed on a display 77 according to the currently selected display mode.

At step S31, the control unit 52 determines whether or not a control signal is transmitted from the remote controller 1 to the operation-signal reception unit 54, and waits until it is determined that the control signal is transmitted to the operation-signal reception unit 54. If it is determined that the operation signal is transmitted to the operation-signal reception unit 54, the processing advances to step S32.

At step S32, the control unit 52 determines whether or not the transmitted operation signal indicates an instruction for changing the display mode. If the determination result is no, the processing advances to step S33 where the control unit 52 performs the processing corresponding to the transmitted operation signal. For example, the control unit 52 controls the tuner 61 so that the tuner 61 switches back and/or forth between reception channels and controls the audio-output unit 65, so as to adjust the sound volume, for example. After that, the processing returns to step S31 and the processing from then on is performed again.

If it is determined that the transmitted operation signal indicates an instruction for changing the display mode, at step S32, the processing advances to step S34.

At step S34, the control unit 52 determines whether or not the transmitted operation signal instructs to change to the display mode 1. If it is determined that the operation signal instructs to change to the display mode 1, the processing advances to step S35 where the video selection-and-composition unit 70 transmits a main-video signal to the following stage under the control of the control unit 52. The video-output unit 71 converts the main-video signal transmitted from the video selection-and-composition unit 70 to a signal in a format appropriate for the display 72 and transmits the signal to the display 72. The display 72 displays the main-video image corresponding to the main-video signal transmitted from the video-output unit 71. At that time, an additional-video image is displayed on the display 33 of the remote controller 1. After that, the processing returns to step S31 and the processing from then on is performed again.

If it is determined that the operation signal does not instruct to change to the display mode 1, at step S34, the processing advances to step S36 where the control unit 52 determines whether or not the transmitted operation signal instructs to change to the display mode 2. If it is determined that the operation signal instructs to change to the display mode 2, the processing advances to step S37. At step S37, the video selection-and-composition unit 70 transmits an additional-video signal to the following stage under the control of the control unit 52. The video-output unit 71 converts the additional-video signal transmitted from the video selection-and-composition unit 70 into a signal in a format appropriate for the display 72 and transmits the signal to the display 72. The display 72 displays the additional-video image corresponding to the additional-video signal transmitted from the video-output unit 71. At that time, the main-video image is displayed on the display 33 of the remote controller 1. After that, the processing returns to step S31 and the processing from then on is performed again.

If it is determined that the operation signal does not instruct to change to the display mode 2, at step S36, it is determined that the operation signal instructs to change to the display mode 3, and the processing advances to step S38 where the video selection-and-composition unit 70 generates a composite-video signal including the main-video signal combined with the additional-video signal and transmits the composite-video signal to the following stage under the control of the control unit 52. The video-output unit 71 converts the composite-video signal transmitted from the video selection-and-composition unit 70 into a signal in a format appropriate for the display 72 and transmits the signal to the display 72. The display 72 displays the composite-video image corresponding to the composite-video signal transmitted from the video-output unit 71. At that time, the main-video image and the additional-video image, and/or the composite video image is displayed on the display 33 of the remote controller 1. After that, the processing returns to step S31 and the processing from then on is performed again. The description of the processing procedures performed by the TV receiver 2 is hereby finished.

In addition to the above-described three types of display modes, there may be provided a display mode that makes the display 33 of the remote controller 1 display the main-video image alone and that makes the display 72 of the TV receiver 72 display a video image showing a magnified predetermined area of the main-video image. Further, there may be provided a display mode that makes the display 33 display an OSD-video image (showing the number and/or icon of a channel while tuning is performed, a number representing the sound volume, the level gage, and so forth) and that makes the display 72 display the main-video image.

Thus, according to the TV system described in an embodiment of the present invention, it becomes possible to make one of the display 33 of the remote controller 1 and the display 72 of the TV receiver 2 display the main-video image and make the other display the additional-video image according to the display mode set by the user. Therefore, it becomes possible to prevent the main-video image from being disturbed by the additional-video image. Further, it becomes possible to check the additional-video image while seeing the main-video image. Further, it becomes possible to use the remote controller 1, as a mobile TV receiver.

The present invention can be used for a system including a remote controller and an apparatus and/or a device (a video recorder, a set-top box, an image-processing device, and so forth) which receives a TV-broadcast signal under the control of the remote controller.

The above-described steps performed according to the above-described programs, as in the specification, include not only processing executed in time sequence according to the written order but also processing that is not necessarily executed in time sequence but can be executed in parallel and/or separately.

Further, in this specification, the term "system" denotes the entire apparatus including a plurality of devices and/or apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A remote-control system including a video-reception device configured to receive a first broadcasted video signal and to display a video image corresponding to the first broadcasted video signal, and a remote controller configured to control the video-reception device, the system comprising:
　the remote controller including
　　a receive unit configured to receive a second broadcasted video signal associated with, and encoded differently from, the first broadcasted video signal,
　　a display unit configured to display a video image on the basis of the second broadcasted video signal,
　　a reception unit configured to receive information about an operation performed by a user,
　　a transmission unit configured to transmit an operation signal generated for the video-reception device, and
　　a first control unit configured to control the transmission units, according to the user-operation information received by the reception unit, to transmit the operation signal, and
　the video-reception device including
　　a detection unit configured to detect the transmitted operation signal, and
　　a second control unit configured to control at least one unit of the video-reception device according to the detected operation signal.

2. A display-control method for a remote-control system including a video-reception device configured to receive a first broadcasted video signal and to display a video image corresponding to the first broadcasted video signal, and a remote controller with a display configured to control the video-reception device, the method comprising:
　receiving a second broadcasted video signal associated with, and encoded differently from, the first broadcasted video signal in the remote controller with the display;
　displaying a video image generated on the basis of the second broadcasted video signal on the remote controller with the display;
　receiving information about an operation performed by a user in the remote controller with the display;
　transmitting an operation signal for the video-reception device from the remote controller with the display;
　detecting the transmitted operation signal in the video-reception device; and
　controlling at least one unit of the video-reception device according to the detected operation signal in the video-reception device.

3. A remote controller for controlling a video-reception device configured to receive a first broadcasted video signal and to display a video image corresponding to the first broadcasted video signal, the remote controller comprising:
- a receive unit configured to receive a second broadcasted video signal associated with, but encoded differently from the first broadcasted video signal;
- a display unit configured to display a video image generated on the basis of the second broadcasted video signal;
- a reception unit configured to receive information about an operation performed by a user;
- a transmission unit configured to transmit an operation signal for the video-reception device; and
- a control unit configured to control the transmission unit; according to the user-operation information received by the reception unit, to transmit the operation signal.

4. The remote controller according to claim 3, wherein, according to the user-operation information received by the reception unit, the control unit is configured to control the transmission unit to transmit the operation signal for controlling video display performed by the video-reception device and to control the display unit.

5. The remote controller according to claim 4, wherein, according to the user-operation information received by the reception unit, the control unit is configured to control the transmission unit to transmit the operation signal for controlling video display performed by the video-reception device and to control the display unit in relation to the video display performed by the video-reception device.

6. The remote controller according to claim 5, wherein the second broadcasted video signal includes a main-video signal and an additional-information signal, and
wherein when the user-operation information received by the reception unit instructs the video-reception device to display only a video image generated on the basis of the main-video signal, the control unit is configured to control the display unit to display a video image generated on the basis of the additional-information signal.

7. The remote controller according to claim 5, wherein the second broadcasted video signal includes a main-video signal and an additional-information signal, and
wherein when the user-operation information received by the reception unit instructs the video-reception device to display only a video image generated on the basis of the additional-information signal, the control unit is configured to control the display unit to display a video image generated on the basis of the main-video signal.

8. The remote controller according to claim 3, further comprising a drawing unit configured to draw a frame including a zoom-object position on the display unit,
wherein the drawing unit is configured to draw the frame according to the user-operation information received by the reception unit, and
wherein the control unit is configured to control the transmission unit to transmit the operation signal including the position and size of the drawn frame.

9. A display-control method for a remote controller with a display, the remote controller being configured to control a video-reception device, configured to receive a first broadcasted video signal and to display a video image corresponding to the first broadcasted video signal, the display-control method comprising:
- receiving a second broadcasted video signal associated with, and encoded differently from, the first broadcasted video signal;
- displaying a video image generated on the basis of the second broadcasted video signal;
- receiving information about an operation performed by a user; and
- transmitting an operation signal for the video-reception device according to the received user-operation information.

10. The remote-control system according to claim 1, wherein
the video image displayed based on the second broadcasted video signal includes the same content as the video image displayed based on the first broadcasted video signal.

11. The display-control method according to claim 2, wherein
the video image displayed based on the second broadcasted video signal includes the same content as the video image displayed based on the first broadcasted video signal.

12. The remote controller according to claim 3, wherein
the video image displayed based on the second broadcasted video signal includes the same content as the video image displayed based on the first broadcasted video signal.

13. The display-control method according to claim 9, wherein
the video image displayed based on the second broadcasted video signal includes the same content as the video image displayed based on the first broadcasted video signal.

* * * * *